United States Patent
Huang et al.

(10) Patent No.: US 10,103,425 B2
(45) Date of Patent: Oct. 16, 2018

(54) MOBILE DEVICE

(71) Applicants: Chin-Cheng Huang, Taipei (TW); Hsin-Chih Huang, Taipei (TW)

(72) Inventors: Chin-Cheng Huang, Taipei (TW); Hsin-Chih Huang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 54 days.

(21) Appl. No.: 15/273,721

(22) Filed: Sep. 23, 2016

(65) Prior Publication Data

US 2017/0358843 A1    Dec. 14, 2017

(30) Foreign Application Priority Data

Jun. 14, 2016   (TW) .............................. 105118507 A

(51) Int. Cl.
*H01Q 3/24*        (2006.01)
*H04B 7/08*        (2006.01)
(Continued)

(52) U.S. Cl.
CPC .............. *H01Q 1/243* (2013.01); *H01Q 3/24* (2013.01); *H01Q 21/00* (2013.01); *H01Q 21/28* (2013.01);
(Continued)

(58) Field of Classification Search
CPC ...... H01Q 3/24; H04B 7/0817; H04B 7/0868; H04B 7/068; H04B 7/0831; H04B 7/0686
See application file for complete search history.

(56) References Cited

U.S. PATENT DOCUMENTS

| | | | |
|---|---|---|---|
| 6,560,443 B1* | 5/2003 | Vaisanen ................. | H01Q 3/24 455/553.1 |
| 2003/0176176 A1* | 9/2003 | Leinonen ................ | H04B 7/12 455/277.1 |

(Continued)

FOREIGN PATENT DOCUMENTS

| TW | I483572 | 5/2015 |
|---|---|---|
| TW | I493892 | 7/2015 |

OTHER PUBLICATIONS

"Office Action of Taiwan Counterpart Application," dated May 24, 2017, p. 1-p. 4.

*Primary Examiner* — Dameon E Levi
*Assistant Examiner* — Ricardo Magallanes
(74) *Attorney, Agent, or Firm* — JCIPRNET

(57) ABSTRACT

A mobile device includes a diversity antenna, a radio-frequency antenna, a first wireless communication circuit, a second wireless communication circuit and a first switching circuit. The second wireless communication circuit is electrically connected to the radio-frequency antenna. The first switching circuit is electrically connected to the diversity antenna, the first wireless communication circuit and the second wireless communication circuit. In a first mode, the diversity antenna is conducted to the first wireless communication circuit through the first switching circuit, and the first wireless communication circuit receives a wireless signal through the diversity antenna. In a second mode, the diversity antenna is conducted to the second wireless communication circuit through the first switching circuit, and the second wireless communication circuit executes a multi-input multi-output transmission through the diversity antenna and the radio-frequency antenna.

10 Claims, 2 Drawing Sheets

(51) Int. Cl.
*H04B 7/06* (2006.01)
*H01Q 1/24* (2006.01)
*H01Q 21/00* (2006.01)
*H01Q 21/28* (2006.01)

(52) U.S. Cl.
CPC ......... *H04B 7/0686* (2013.01); *H04B 7/0817* (2013.01); *H04B 7/0868* (2013.01)

(56) References Cited

U.S. PATENT DOCUMENTS

| | | | |
|---|---|---|---|
| 2010/0157860 A1* | 6/2010 | Hagiwara | H04B 1/0057 370/310 |
| 2010/0260082 A1* | 10/2010 | Lum | H04B 1/0057 370/297 |
| 2014/0349584 A1 | 11/2014 | Clevorn et al. | |

* cited by examiner

MOBILE DEVICE

CROSS-REFERENCE TO RELATED APPLICATION

This application claims the priority benefit of Taiwan application serial no. 105118507, filed on Jun. 14, 2016. The entirety of the above-mentioned patent application is hereby incorporated by reference herein and made a part of this specification.

BACKGROUND OF THE INVENTION

1. Field of the Invention

The invention generally relates to a mobile device, and more particularly, to a mobile device capable of sharing a diversity antenna.

2. Description of Related Art

Multi-input multi-output (MIMO) technology can increase a data throughput and a transmission distance under a condition of not increasing bandwidth or total transmit power expenditure, and thus receives much attention in recent years. Specifically, the MIMO technology uses a plurality of antennas disposed in respective mobile device to increase transmission paths between a receiving end and a transmitting end, so as to suppress channel fading.

However, under a slim and light developing trend of the mobile devices, conventional mobile devices, as usually being restricted by the volume, still adopt single-input single-output (SISO) technology. For instance, in a limited hardware space, most of the conventional mobile devices can only be disposed with a single WiFi antenna. Thus, the conventional mobile devices usually can only select the SISO technology to receive or emit the WiFi signal, thereby causing the data throughput to be limited.

SUMMARY OF THE INVENTION

The invention is directed to a mobile device, which enables a first wireless communication circuit and a second wireless communication circuit to share a diversity antenna through a switching of the first switching circuit, thereby increasing a data throughput and a data transmission rate, and thus is facilitative to the miniaturization of the mobile device.

The mobile device of the invention includes a diversity antenna, a radio-frequency antenna, a first wireless communication circuit, a second wireless communication circuit and a first switching circuit. The second wireless communication circuit is electrically connected to the radio-frequency antenna. The first switching circuit is electrically connected to the diversity antenna, the first wireless communication circuit and the second wireless communication circuit. In a first mode, the diversity antenna is conducted to the first wireless communication circuit through the first switching circuit, and the first wireless communication circuit receives a wireless signal through the diversity antenna. In the second mode, the diversity antenna is conducted to the second wireless communication circuit through the first switching circuit, and the second wireless communication circuit executes the multi-input multi-output transmission through the radio-frequency antenna and the diversity antenna.

In one embodiment of the invention, the mobile device further includes a main antenna. The main antenna is electrically connected to the first wireless communication circuit, and in the first mode, the first wireless communication circuit receives the wireless signal further through the main antenna.

In one embodiment of the invention, the main antenna includes a first antenna and a second antenna, and the mobile device further includes a second switching circuit. The second switching circuit is electrically connected to the first antenna, the first wireless communication circuit and the second wireless communication circuit, and the second antenna is electrically connected to the first wireless communication circuit. In the first mode, the first antenna is conducted to the first wireless communication circuit through the second switching circuit, and the first wireless communication circuit receives the wireless signal further through the first antenna and the second antenna. In the second mode, the first antenna is conducted to the second wireless communication circuit through the second switching circuit, and the second wireless communication circuit executes the multi-input multi-output transmission further through the first antenna.

In view of the above, the mobile device of the invention can use the first switching circuit to switch the diversity antenna to the first wireless communication circuit or the second wireless communication circuit, so as to enable the first wireless communication circuit and the second wireless communication circuit to share the diversity antenna. As such, it is facilitative to the of the miniaturization of the mobile device, and the mobile device can further execute the multi-input multi-output transmission so as to increase the data throughput and the data transmission rate.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
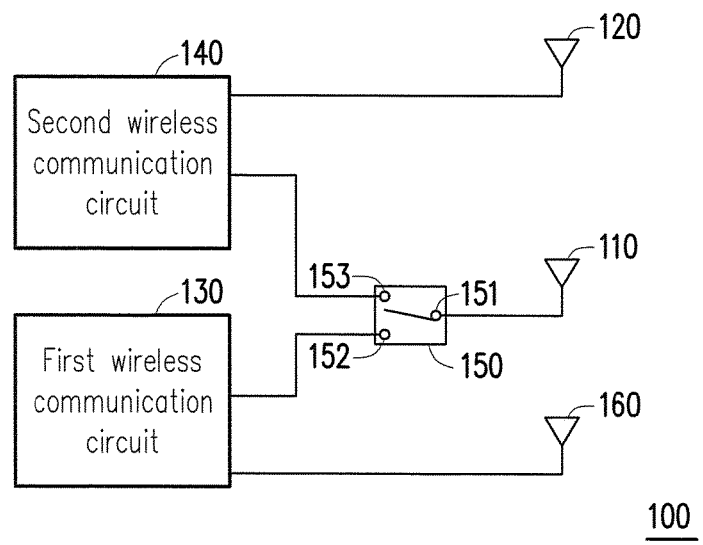
FIG. 1 is a schematic diagram illustrating a mobile device according to an embodiment of the invention.

FIG. 1 is a schematic diagram illustrating a mobile device according to an embodiment of the invention. As shown in FIG. 1, a mobile device 100 includes a diversity antenna 110, a radio-frequency antenna 120, a first wireless communication circuit 130, a second wireless communication circuit 140 and a first switching circuit 150. The second wireless communication circuit 140 is electrically connected to the radio-frequency antenna 120. The first switching circuit 150 is electrically connected to the diversity antenna 110, the first wireless communication circuit 130 and the second wireless communication circuit 140.

In terms of operation, the mobile device 100 includes a first mode and a second mode. In addition, the mobile device 100 can control a state of the first switching circuit 150 by using control information, so as to enable the first switching circuit 150 to conduct the diversity antenna 110 to different wireless communication circuits in response to different modes. For instance, the first switching circuit 150 includes first to third ends 151-153. The first end 151 of the first switching circuit 150 is electrically connected to the diversity antenna 110. The second end 152 of the first switching circuit 150 is electrically connected to the first wireless communication circuit 130. The third end 153 of the first switching circuit 150 is electrically connected to the second wireless communication circuit 140. Moreover, the first end 151 of the first switching circuit 150 can be electrically connected to one of the second end 152 and the third end 153 of the first switching circuit 150 in response to the control information.

Specifically, in the first mode, the first end 151 of the first switching circuit 150 is electrically connected to the second end 152 of the first switching circuit 150, so that the diversity antenna 110 can be conducted to the first wireless communication circuit 130 through the first switching circuit 150. In addition, the first wireless communication circuit 130 can receive a wireless signal through the diversity antenna 110, so as to increase a receiving capacity. For instance, the mobile device 100 further includes a main antenna 160, and the main antenna 160 is electrically connected to the first wireless communication circuit 130. In the first mode, the main antenna 160 and the diversity antenna 110 can be used to receive the same wireless signal, and the first wireless communication circuit 130 can process the wireless signal received by the main antenna 160 and the diversity antenna 110. As such, the first wireless communication circuit 130 can select one from the main antenna 160 and the diversity antenna 110, so as to use the antenna (i.e., one of the main antenna 160 and the diversity antenna 110) that forms a more preferable transmission path, for continually receiving the wireless signal, and thereby is facilitative in enhancing the receiving capability of the first wireless communication circuit 130.

On the other hand, in the second mode, the first end 151 of the first switching circuit 150 is electrically connected to the third end 153 of the first switching circuit 150, so that the diversity antenna 110 can be conducted to the second wireless communication circuit 140 through the first switching circuit 150. In addition, the second wireless communication circuit 140 can receive or emit the wireless signal through the radio-frequency antenna 120 and the diversity antenna 110, simultaneously, so that the second wireless communication circuit 140 can support 2×2 multi-input multi-output (MIMO) technology. Namely, in the second mode, the second wireless communication circuit 140 can execute a MIMO transmission through the radio-frequency antenna 120 and the diversity antenna 110, that is, the second wireless communication circuit 140 can use the MIMO technology to receive or emit the wireless signal.

In other words, through the switching of the first switching circuit 150, the diversity antenna 110, in addition to increase the receiving capability of the first wireless communication circuit 130, can further serve as an operation antenna of the second wireless communication circuit 140. Namely, with the configuration of the first switching circuit 150, the first wireless communication circuit 130 and the second wireless communication circuit 140 can share the diversity antenna 110. As a result, it is facilitative in reducing a volume of the mobile device 100, and thus is facilitative in the miniaturization of the mobile device 100. In addition, through sharing the diversity antenna 110, the mobile device 100 can further use the MIMO technology to receive or emit the wireless signal, so as to effectively increase a data throughput and a data transmission rate.

It is worth mentioning that, the radio-frequency antenna 120 can, for example, be a dual-band antenna, and can cover a first band and a second band. In addition, an operating band of the diversity antenna 110 and the first band of the radio-frequency antenna 120 partially overlap, and a frequency doubling band (i.e., second harmonic band) of the operating band of the diversity antenna 110 and the second band of the radio-frequency antenna 120 partially overlap. For instance, in one embodiment, the radio-frequency antenna 120 can cover a 2.4 GHz band (i.e., the first band) and a 5 GHz band (i.e., the second band). In addition, the operating band of the diversity antenna 110 includes 2.1 GHz to 2.6 GHz. That is, the operating band of the diversity antenna 110, in addition to including the 2.4 GHz band, further includes the 2.1 GHz band and the 2.6 GHz band. In addition, the first switching circuit 150 can be composed of one or more high-frequency switches, and an insertion loss of the first switching circuit 150 between 1 GHz and 6 GHz ranges from 0.3 to 0.85 dB.

In other words, in one embodiment, the radio-frequency antenna 120 can support operating bands under WiFi and Bluetooth communication technologies. That is, the radio-frequency antenna 120 is, for example, a WiFi antenna capable of covering the 2.4 GHz band and the 5 GHz band. Moreover, when the mobile device 100 is switched to the second mode (e.g., WiFi mode), the diversity antenna 110 can be used to serve as another WiFi antenna. As such, the mobile device 100 can execute the MIMO transmission through the diversity antenna 110 and the radio-frequency antenna 120, so as to receive or emit WiFi signal through the MIMO transmission.

Moreover, in one embodiment, the diversity antenna 110 can support the 2.1 GHz band and the 2.6 GHz band under the fourth-generation (4G) mobile communication technology used by Asia-Pacific regions (e.g., Mainland China, India and Indonesia). That is, the diversity antenna 110 can support the operating band (e.g., LTE band 38, band 40 and band 41) under the time-division long term evolution (TD-LTE) technology used by Mainland China. In other words, when the mobile device 100 is switched to the first mode (e.g., general mode), the mobile device 100 can receive a signal under the LTE band through the main antenna 160 and the diversity antenna 110.

In addition, in order to enhance a performance of the second wireless communication circuit, the second wireless communication circuit 140 can further be disposed with a front end circuit. The front end circuit is integrated with a power amplifier (PA) and a low noise amplifier (LNA). In addition, the front end circuit can enhance a radiated power and a receiving sensitivity of the diversity antenna 110, and the insertion loss can be compensated through the front end circuit, so that a performance enhancement of the overall system can be nearly up to 4 dB to 6 dB. As a result, the communication quality of the second wireless communication circuit 140 under the first band (e.g., 2.4 GHz band) and the second band (e.g., 5 GHz band) can be further increased.

Figure 2:
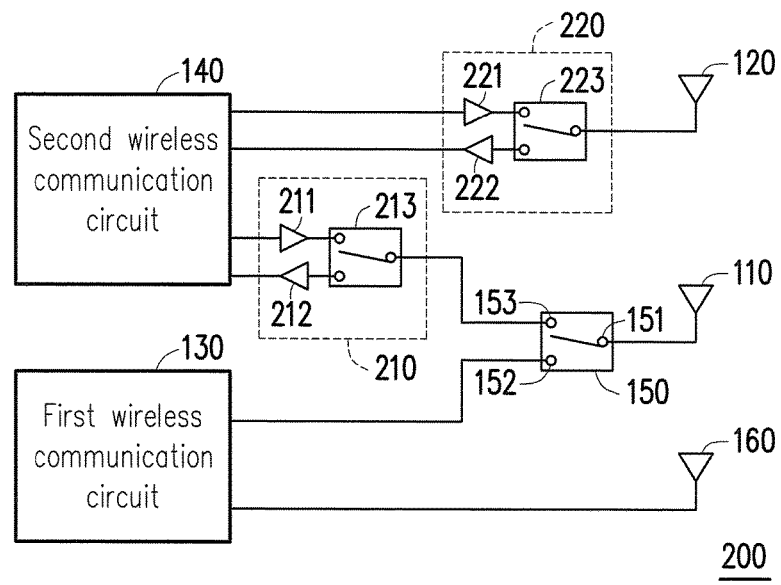
FIG. 2 is a schematic diagram illustrating a mobile device according to another embodiment of the invention.

For instance, FIG. 2 is a schematic diagram illustrating a mobile device according to another embodiment of the invention. As compared to the embodiment of FIG. 1, a mobile device 200 in FIG. 2 further includes a first front-end circuit 210 and a second front-end circuit 220. In addition, the first front-end circuit 210 is disposed between the third end 153 of the first switching circuit 150 and the second wireless communication circuit 140, and the first front-end circuit 210 includes a first power amplifier 211, a first low noise amplifier 212 and a first switch 213. The second front-end circuit 220 is disposed between the radio-frequency antenna 120 and the second wireless communication circuit 140, and the second front-end circuit 220 includes a second power amplifier 221, a second low noise amplifier 222 and a second switch 223.

Specifically, in the second mode, the second wireless communication circuit 140 can execute an emitting operation or a receiving operation in the MIMO transmission through the radio-frequency antenna 120 and diversity antenna 110. For instance, when the second wireless communication circuit 140 executes the emitting operation in the MIMO transmission, the first power amplifier 211 is conducted to the third end 153 of the first switching circuit 150 through the first switch 213, the second power amplifier 221 is conducted to the radio-frequency antenna 120 through the second switch 223, and the first end 151 and the third end 153 of the first switching circuit 150 are electrically connected. Meanwhile, the first power amplifier 211 and the second power amplifier 221 can respectively amplify a signal from the second wireless communication circuit 140, and the diversity antenna 110 and the radio-frequency antenna 120 can convert output signals of the first power amplifier 211 and the second power amplifier 221 into the wireless signals.

On the other hand, when the second wireless communication circuit 140 executes the receiving operation in the MIMO transmission, the first low noise amplifier 212 is conducted to the third end 153 of the first switching circuit 150 through the first switch 213, the second low noise amplifier 222 is conducted to the radio-frequency antenna 120 through the second switch 223, and the first end 151 and the third end 153 of the first switching circuit 150 are electrically connected. Meanwhile, the first low noise amplifier 212 and the second low noise amplifier 222 can amplify the signals from the diversity antenna 110 and the radio-frequency antenna 120, and the second wireless communication circuit 140 can receive output signals of the first low noise amplifier 212 and the second low noise amplifier 222. Descriptions regarding detailed structures and operations of the rest of the components in the embodiment of FIG. 2 are all included in the embodiment of FIG. 1, and thus will not be repeated herein.

Figure 3:
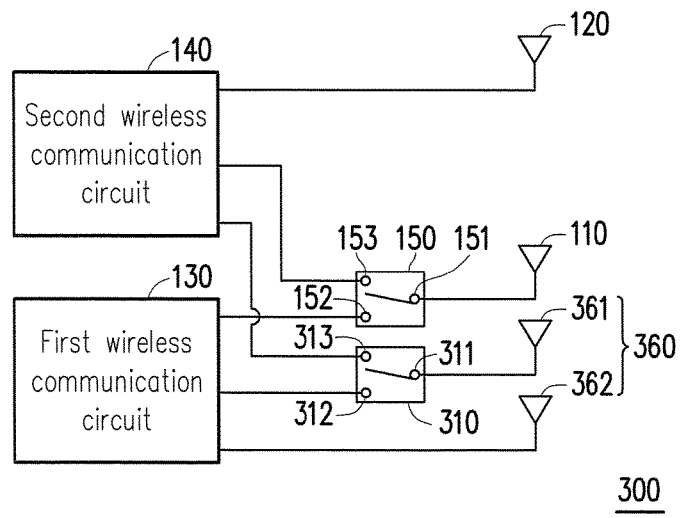
FIG. 3 is a schematic diagram illustrating a mobile device according to another embodiment of the invention

It is noteworthy that, in another embodiment, the mobile device 100 can further use a portion of the main antenna to serve as another operation antenna of the second wireless communication circuit 140, so as to enable the second wireless communication circuit 140 to execute a 3×3 MIMO transmission. For instance, FIG. 3 is a schematic diagram illustrating a mobile device according to another embodiment of the invention. As compared to the embodiment of FIG. 1, a mobile device 300 in FIG. 3 further includes a second switching circuit 310, and a main antenna 360 in FIG. 3 includes a first antenna 361 and a second antenna 362.

Specifically, the first antenna 361 and the second antenna 362 cover different bands. For instance, the first antenna 361 can cover high frequency band or medium-high frequency band, and the second antenna 362 can cover low frequency band or medium-low frequency band. As such, the mobile device 300 can integrate bandwidths of a plurality of bands, so as to use carrier aggregation technology to further increase the data throughput and the data transmission rate.

The second switching circuit 310 is electrically connected to the first antenna 361, the first wireless communication circuit 130 and the second wireless communication circuit 140, and the second antenna 362 is electrically connected to the first wireless communication circuit 130. In addition, the mobile device 300 can control a state of the second switching circuit 310 through using the control information, so that the second switching circuit 310 can conducted the first antenna 361 to different wireless communication circuits in response to different modes. For instance, the second switching circuit 310 includes first to third ends 311-313. The first end 311 of the second switching circuit 310 is electrically connected to the first antenna 361. The second end 312 of the second switching circuit 310 is electrically connected to the first wireless communication circuit 130. The third end 313 of the second switching circuit 310 is electrically connected to the second wireless communication circuit 140.

In the first mode, the first end 311 and the second end 312 of the second switching circuit 310 can be electrically connected with each other in response to the control information. As such, the first antenna 361 can be conducted to the first wireless communication circuit 130 through the second switching circuit 310. In addition, the diversity antenna 110 in the first mode can be conducted to the first wireless communication circuit 130 through the first switching circuit 150. As such, the first wireless communication circuit 130 can receive the wireless signal through the first antenna 361, the second antenna 362 and the diversity antenna 110, so as to increase the receiving capability.

In the second mode, the first end 311 and the third end 313 of the second switching circuit 310 can be electrically connected with each other in response to the control information. As such, the first antenna 361 can be conducted to the second wireless communication circuit 140 through the second switching circuit 310. In addition, the diversity antenna 110 in the second mode can be conducted to the second wireless communication circuit 140 through the first switching circuit 150. As such, the second wireless communication circuit 140 can receive or emit the wireless signal through the radio-frequency antenna 120, the diversity antenna 110 and the first antenna 361, simultaneously, so that the second wireless communication circuit 140 can support the 3×3 MIMO technology. That is, in the second mode, the second wireless communication circuit 140 can execute the 3×3 MIMO transmission through the diversity antenna 110, the radio-frequency antenna 120 and the first antenna 361.

In other words, with the configuration of the second switching circuit 310, the first wireless communication circuit 130 and the second wireless communication circuit 140 can share the first antenna 361 in the main antenna 360. As a result, it is facilitative in reducing a volume of the mobile device 300, and the mobile device 300 can further use the MIMO technology to receive or emit the wireless signal, thereby effectively increase the data throughput and the data transmission rate.

It is worth mentioning that, an operating band of the first antenna 361 and the first band of the radio-frequency antenna 120 partially overlap, and a frequency doubling band (i.e., second harmonic band) of the operating band of the first antenna 361 and the second band of the radio-frequency antenna 120 partially overlap. For instance, in one embodiment, the radio-frequency antenna 120 can cover the 2.4 GHz band (i.e., the first band) and the 5 GHz band (i.e., the second band), and the operating band of the first antenna 361 includes 2.1 GHz to 2.6 GHz. In addition, the second switching circuit 310 can be composed of one or more high-frequency switches, and an insertion loss of the second switching circuit 310 between 1 GHz and 6 GHz is smaller than 0.85 dB.

In other words, in one embodiment, when the mobile device 200 is switched to the second mode (e.g., the WiFi mode), the radio-frequency antenna 120, the diversity antenna 110 and the first antenna 361 can all respectively be used as a WiFi antenna, so that the mobile device 300 can receive or emit the WiFi signal through the MIMO transmission. On the other hand, when the mobile device 300 is switched to the first mode (e.g., the general mode), the mobile device 300 can receive the signals under the 2.1 GHz band and the 2.6 GHz band through the main antenna 360 and the diversity antenna 110, so as to support the operating band (e.g., the LTE band 38, the band 40 and the band 41) under the TD-LTE used by the Mainland China.

Figure 4:
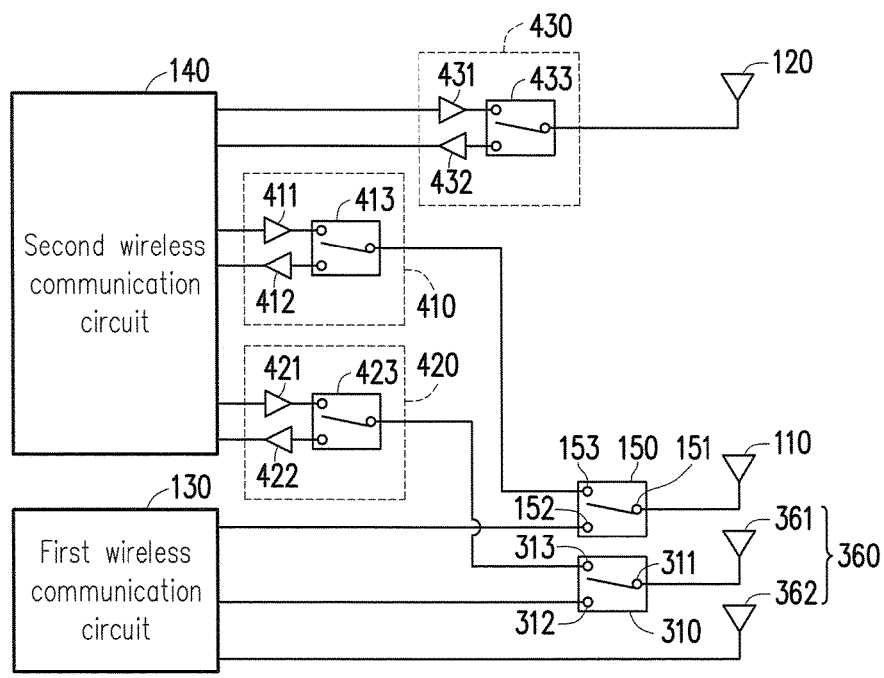
FIG. 4 is a schematic diagram illustrating a mobile device according to another embodiment of the invention

In addition, the mobile device 300 in FIG. 3 can further be disposed with the front end circuits so as to further enhance the communication quality. For instance, FIG. 4 is a schematic diagram illustrating a mobile device according to another embodiment of the invention. As compared to the embodiment of FIG. 3, a mobile device 400 in FIG. 4 further includes a first front-end circuit 410, a second front-end circuit 420 and a third front-end circuit 430. In addition, the first front-end circuit 410 is disposed between the third end 153 of the first switching circuit 150 and the second wireless communication circuit 140, and the first front-end circuit 410 includes a first power amplifier 411, a first low noise amplifier 412 and a first switch 413. The second front-end circuit 420 is disposed between the third end 313 of the second switching circuit 310 and the second wireless communication circuit 140, and the second front-end circuit 420 includes a second power amplifier 421, a second low noise amplifier 422 and a second switch 423. The third front-end circuit 430 is disposed between the radio-frequency antenna 120 and the second wireless communication circuit 140, and the third front-end circuit 430 includes a third power amplifier 431, a third low noise amplifier 432 and a third switch 433.

Specifically, in the second mode, the second wireless communication circuit 140 can execute the emitting operation or the receiving operation in the MIMO transmission through the radio-frequency antenna 120, the diversity antenna 110 and the first antenna 361. For instance, when the second wireless communication circuit 140 executes the emitting operation in the MIMO transmission, the first power amplifier 411 is conducted to the third end 153 of the first switching circuit 150 through the first switch 413, the second power amplifier 421 is conducted to the third end 313 of the second switching circuit 310 through the second switch 423, the third power amplifier 431 is conducted to the radio-frequency antenna 120 through the third switch 433, the first end 151 and the third end 153 of the first switching circuit 150 are electrically connected, and the first end 311 and the third end 313 of the second switching circuit 310 are electrically connected. Meanwhile, the first to the third power amplifiers 411, 421 and 431 can respectively amply the signal from the second wireless communication circuit 140, and the diversity antenna 110, the first antenna 361 and the radio-frequency antenna 120 can convert output signals of the first to the third power amplifiers 411, 421 and 431 into the wireless signals.

On the other hand, when the second wireless communication circuit 140 executes the receiving operation in the MIMO transmission, the first low noise amplifier 412 is conducted to the third end 153 of the first switching circuit 150 through the first switch 413, the second low noise amplifier 422 is conducted to the third end 313 of the second switching circuit 310 through the second switch 423, the third low noise amplifier 432 is conducted to the radio-frequency antenna 120 through the third switch 433, the first end 151 and the third end 153 of the first switching circuit 150 are electrically connected, and the first end 311 and the third end 313 of the second switching circuit 310 are electrically connected. Meanwhile, the first to the third low noise amplifiers 412, 422 and 432 can amplify the signals from the diversity antenna 110, the first antenna 361 and the radio-frequency antenna 120, and the second wireless communication circuit 140 can receive output signals of the first to the third low noise amplifiers 412, 422 and 432. Descriptions regarding detailed structures and operations of the rest of the components in the embodiments of FIG. 3 and FIG. 4 are all included in each of the previous embodiments, and thus will not be repeated herein.

In summary, the mobile device of the invention can use the first switching circuit to switch the diversity antenna to the first wireless communication circuit or the second wireless communication circuit, so that the first wireless communication circuit and the second wireless communication circuit can share the diversity antenna. As such, it is facilitative to the miniaturization of the mobile device, and the mobile device can further use the MIMO technology to receive or emit the wireless signal, thereby effectively increase the data throughput and the data transmission rate. Moreover, in another embodiment, the mobile device can further be disposed with the second switching circuit. Thus, the first wireless communication circuit and the second wireless communication circuit, in addition to sharing the diversity antenna, can further share the first antenna in the main antenna, thereby further increasing the data throughput and the data transmission rate.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A mobile device, comprising:
   a diversity antenna and a radio-frequency antenna;
   a first wireless communication circuit and a second wireless communication circuit, wherein the second wireless communication circuit is electrically connected to the radio-frequency antenna;
   a first switching circuit, electrically connected to the diversity antenna, the first wireless communication circuit and the second wireless communication circuit, wherein in a first mode, the diversity antenna is conducted to the first wireless communication circuit through the first switching circuit, and the first wireless communication circuit receives a wireless signal through the diversity antenna, and
   in a second mode, the diversity antenna is conducted to the second wireless communication circuit through the first switching circuit, and the second wireless communication circuit executes a multi-input multi-output transmission through the radio-frequency antenna and the diversity antenna;
   a main antenna, electrically connected to the first wireless communication circuit, wherein in the first mode, the first wireless communication circuit further receives the wireless signal through the main antenna, wherein the main antenna comprises a first antenna and a second antenna;
   a second switching circuit, electrically connected to the first antenna, the first wireless communication circuit and the second wireless communication circuit, and the second antenna being electrically connected to the first wireless communication circuit, wherein in the first mode, the first antenna is conducted to the first wireless communication circuit through the second switching circuit, and the first wireless communication circuit further receives the wireless signal through the first antenna and the second antenna, and in the second mode, the first antenna is conducted to the second wireless communication circuit through the second switching circuit, and the second wireless communication circuit further executes the multi-input multi-output transmission through the first antenna;

a first front-end circuit, disposed between the first switching circuit and the second wireless communication circuit, and comprising a first power amplifier, a first low noise amplifier and a first switch; and a second front-end circuit, disposed between the second switching circuit and the second wireless communication circuit, and comprising a second power amplifier, a second low noise amplifier and a second switch, wherein when the second wireless communication circuit executes an emitting operation in the multi-input multi-output transmission, the first power amplifier is conducted to the first switching circuit through the first switch, and the second power amplifier is conducted to the second switching circuit through the second switch, and when the second wireless communication circuit executes a receiving operation in the multi-input multi-output transmission, the first low noise amplifier is conducted to the first switching circuit through the first switch, and the second low noise amplifier is conducted to the second switching circuit through the second switch.

2. The mobile device as recited in claim 1, wherein the first switching circuit comprises a first end electrically connected to the diversity antenna, a second end electrically connected to the first wireless communication circuit and a third end electrically connected to the second wireless communication circuit, in the first mode, the first end and the second end of the first switching circuit are electrically connected, and in the second mode, the first end and the third end of the first switching circuit are electrically connected.

3. The mobile device as recited in claim 1, wherein the radio-frequency antenna covers a first band and a second band, an operating band of the diversity antenna and the first band partially overlap, and a frequency doubling band of the operating band and the second band partially overlap.

4. The mobile device as recited in claim 3, wherein the first band is a 2.4 GHz band, and the second band is a 5 GHz band.

5. The mobile device as recited in claim 4, wherein the operating band of the diversity antenna comprises a 2.1 GHz band and a 2.6 GHz band.

6. The mobile device as recited in claim 1, wherein the radio-frequency antenna covers a first band and a second band, an operating band of the first antenna and the first band partially overlap, and a frequency doubling band of the operating band and the second band partially overlap.

7. The mobile device as recited in claim 6, wherein the first band is a 2.4 GHz band, and the second band is a 5 GHz band.

8. The mobile device as recited in claim 7, wherein the operating band of the first antenna comprises a 2.1 GHz band and a 2.6 GHz band.

9. The mobile device as recited in claim 1, wherein the second switching circuit comprises a first end electrically connected to the first antenna, a second end electrically connected to the first wireless communication circuit and a third end electrically connected to the second wireless communication circuit, in the first mode, the first end and the second end of the second switching circuit are electrically connected, and in the second mode, the first end and the third end of the second switching circuit are electrically connected.

10. The mobile device as recited in claim 1, further comprising:

a third front-end circuit, disposed between the radio-frequency antenna and the second wireless communication circuit, and comprising a third power amplifier, a third low noise amplifier and a third switch, wherein when the second wireless communication circuit executes the emitting operation in the multi-input multi-output transmission, the third power amplifier is conducted to the radio-frequency antenna through the third switch, and when the second wireless communication circuit executes the receiving operation in the multi-input multi-output transmission, the third low noise amplifier is conducted to the radio-frequency antenna through the third switch.

* * * * *